United States Patent [19]
Fujita et al.

[11] Patent Number: 5,134,940
[45] Date of Patent: Aug. 4, 1992

[54] SELF-PROPELLED PLATFORM CAR TYPE CONVEYING SYSTEM

[75] Inventors: Shigeyoshi Fujita, Osaka; Kazuyoshi Fukuhara, Kashiwara; Shigeyoshi Nishihara, Nishinomiya, all of Japan

[73] Assignee: Daifuku Co., Ltd., Osaka, Japan

[21] Appl. No.: 595,094

[22] Filed: Oct. 10, 1990

[30] Foreign Application Priority Data

| Oct. 13, 1989 | [JP] | Japan | 1-119823[U] |
| Oct. 13, 1989 | [JP] | Japan | 1-267758 |
| Mar. 14, 1990 | [JP] | Japan | 2-65086 |
| Jun. 13, 1990 | [JP] | Japan | 2-154824 |

[51] Int. Cl.5 ............................................ B61B 10/00
[52] U.S. Cl. ................................... 104/139; 104/140; 104/108
[58] Field of Search ............... 104/139, 140, 142, 143, 104/144, 146, 165, 106, 107, 108, 118, 119, 138.1, 305, 288, 245

[56] References Cited

U.S. PATENT DOCUMENTS

| 3,532,060 | 10/1970 | Brush | 104/139 |
| 3,774,548 | 11/1973 | Borst | 104/139 X |
| 3,838,648 | 10/1974 | Dahlberg et al. | 104/139 |
| 3,859,925 | 1/1975 | Hartz | 104/139 X |
| 4,671,184 | 6/1987 | Fukuda | 104/140 X |
| 4,691,640 | 9/1987 | Murai | 104/140 |
| 4,776,282 | 10/1988 | Ishikura et al. | 104/139 X |

Primary Examiner—Margaret A. Focarino
Assistant Examiner—Joseph D. Pape
Attorney, Agent, or Firm—Schweitzer Cornman & Gross

[57] ABSTRACT

A self-propelled platform car (SPPC) type conveying system for moving a platform car on a running surface along a predetermined path, which comprises a SPPC having at least three steerable wheels disposed respectively at the front and at the back of the SPPC, at least one of the wheels being motor driven, a guide rail disposed below the predetermined path, front and back steering trolleys having steering means engaged with the guide rail for steering the steering trolleys thereby, and front and rear steering transmitting means for transmitting steering from a steering trolley to a corresponding wheel on one side of the car, the steering transmitting means having coupling members extending substantially vertically along a side of the rolling track.

8 Claims, 9 Drawing Sheets

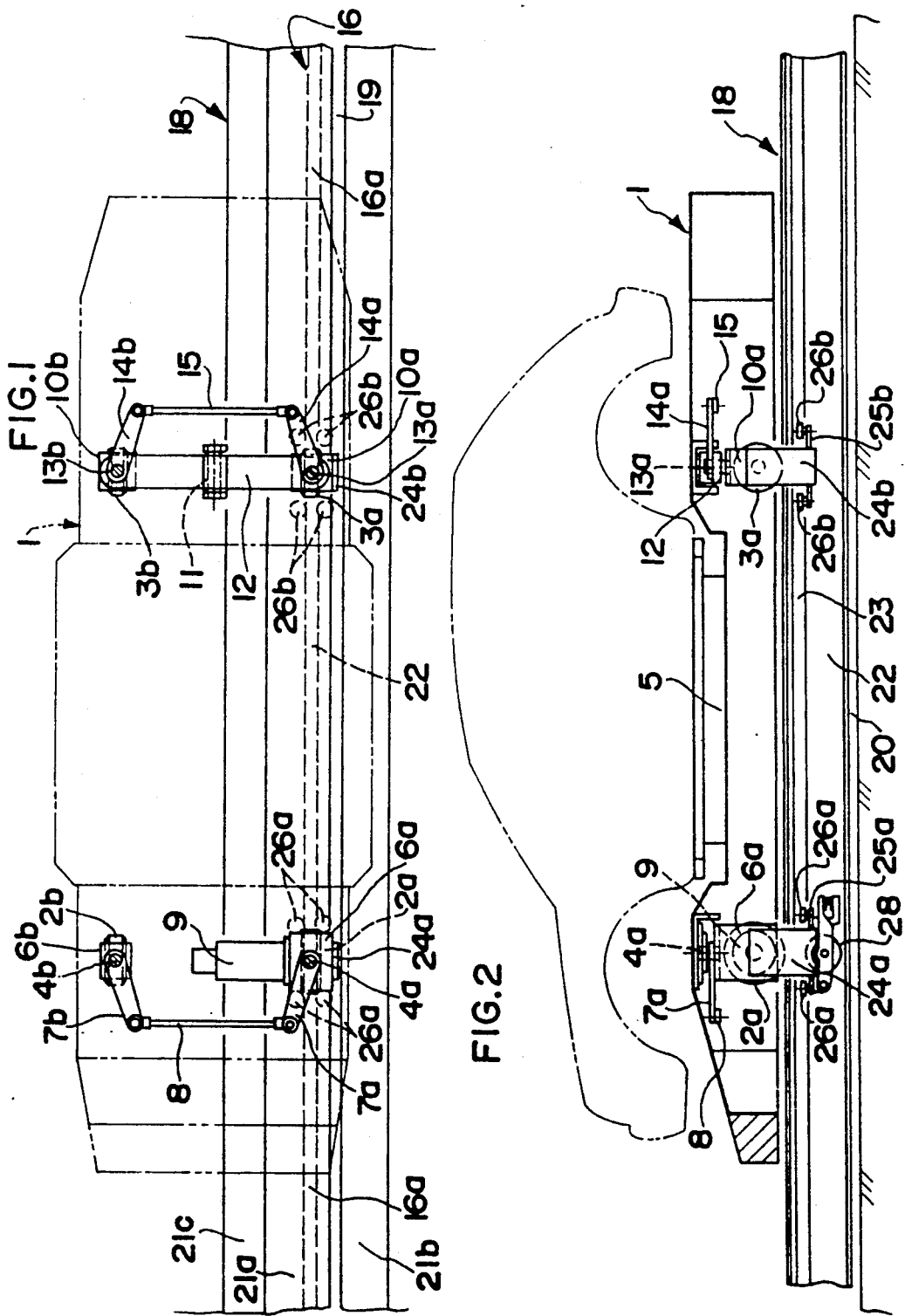

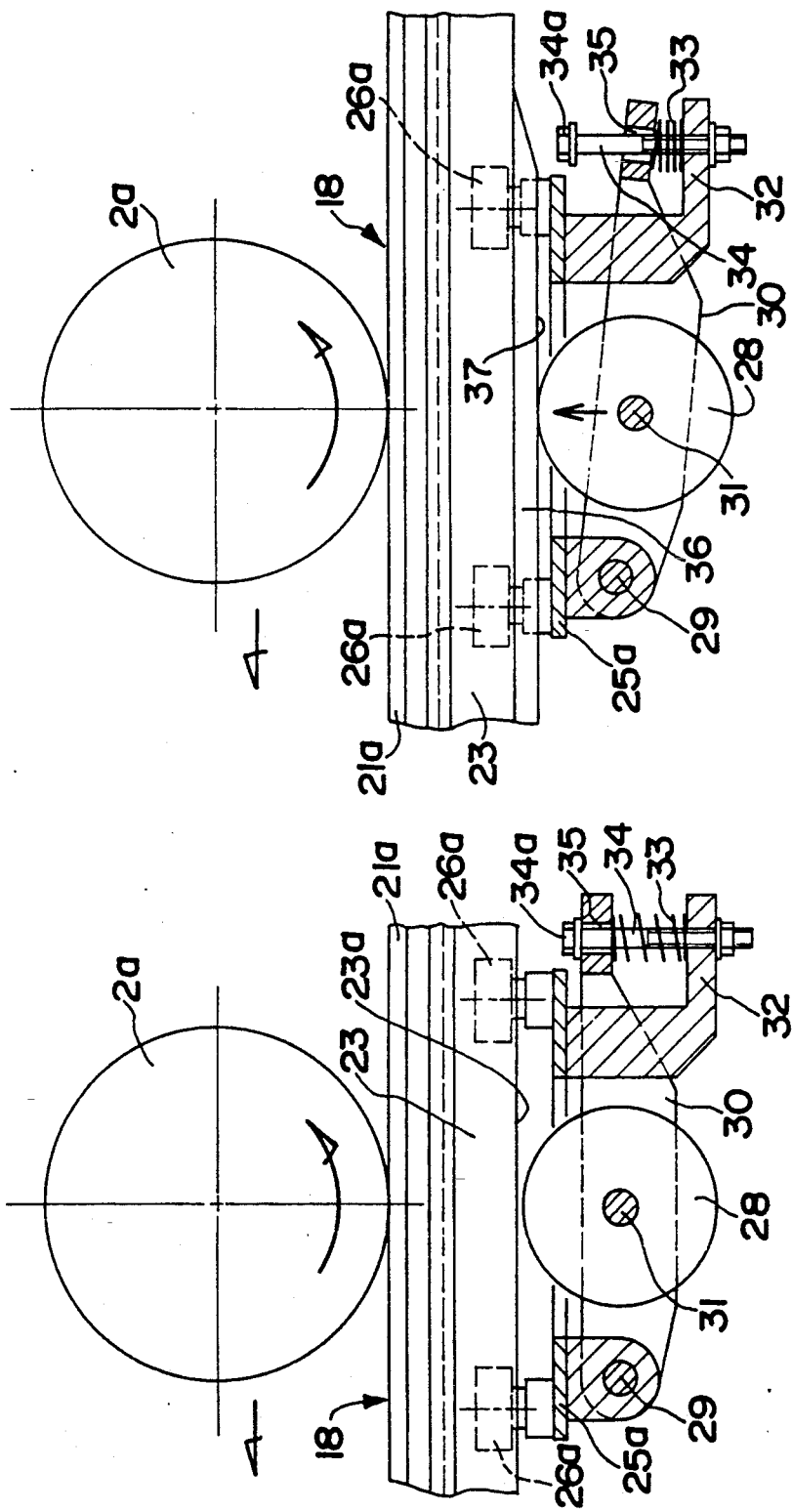

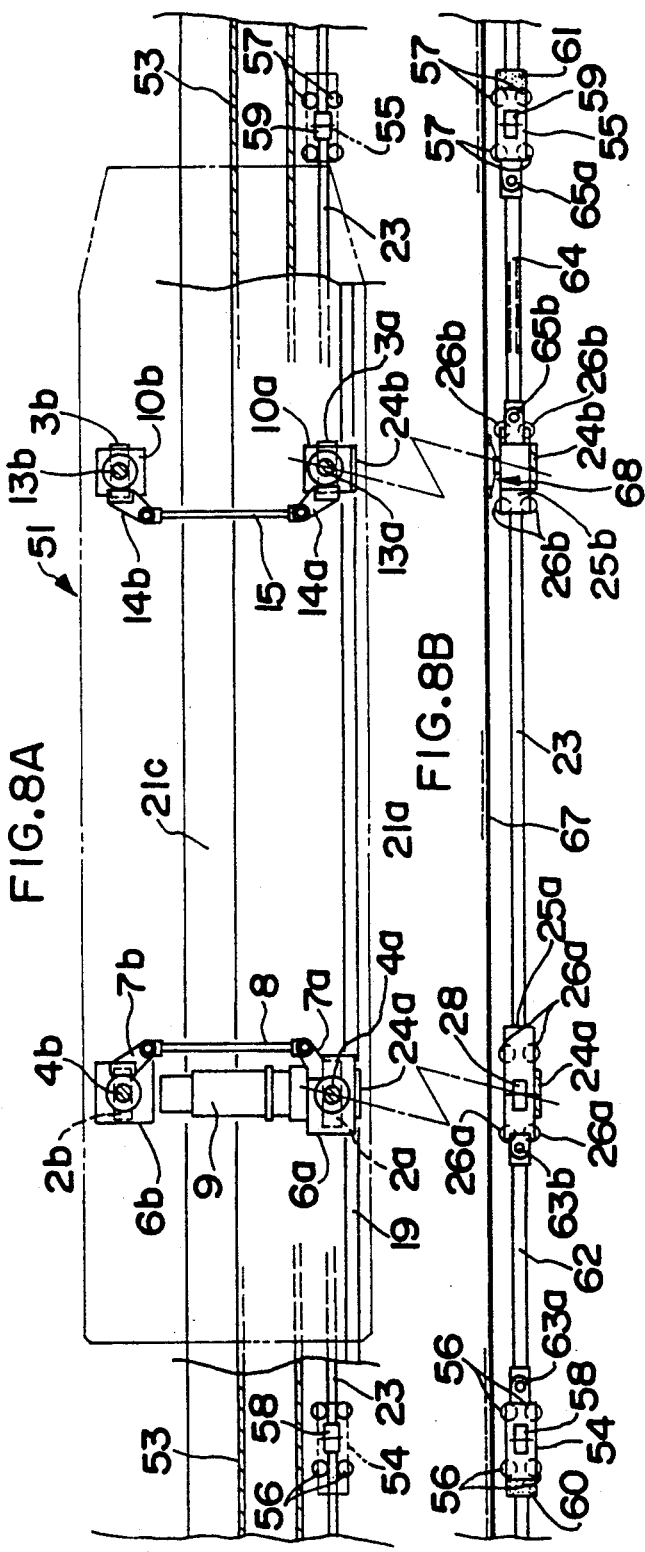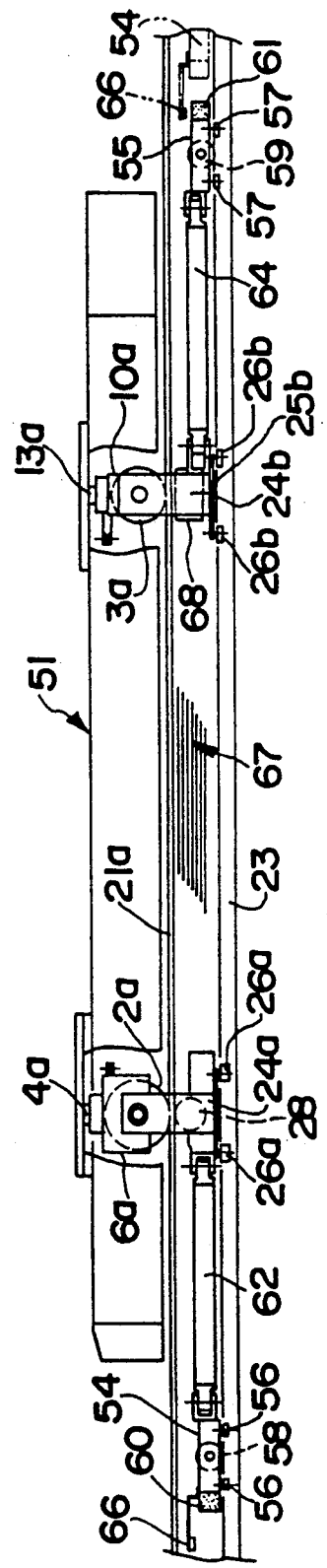

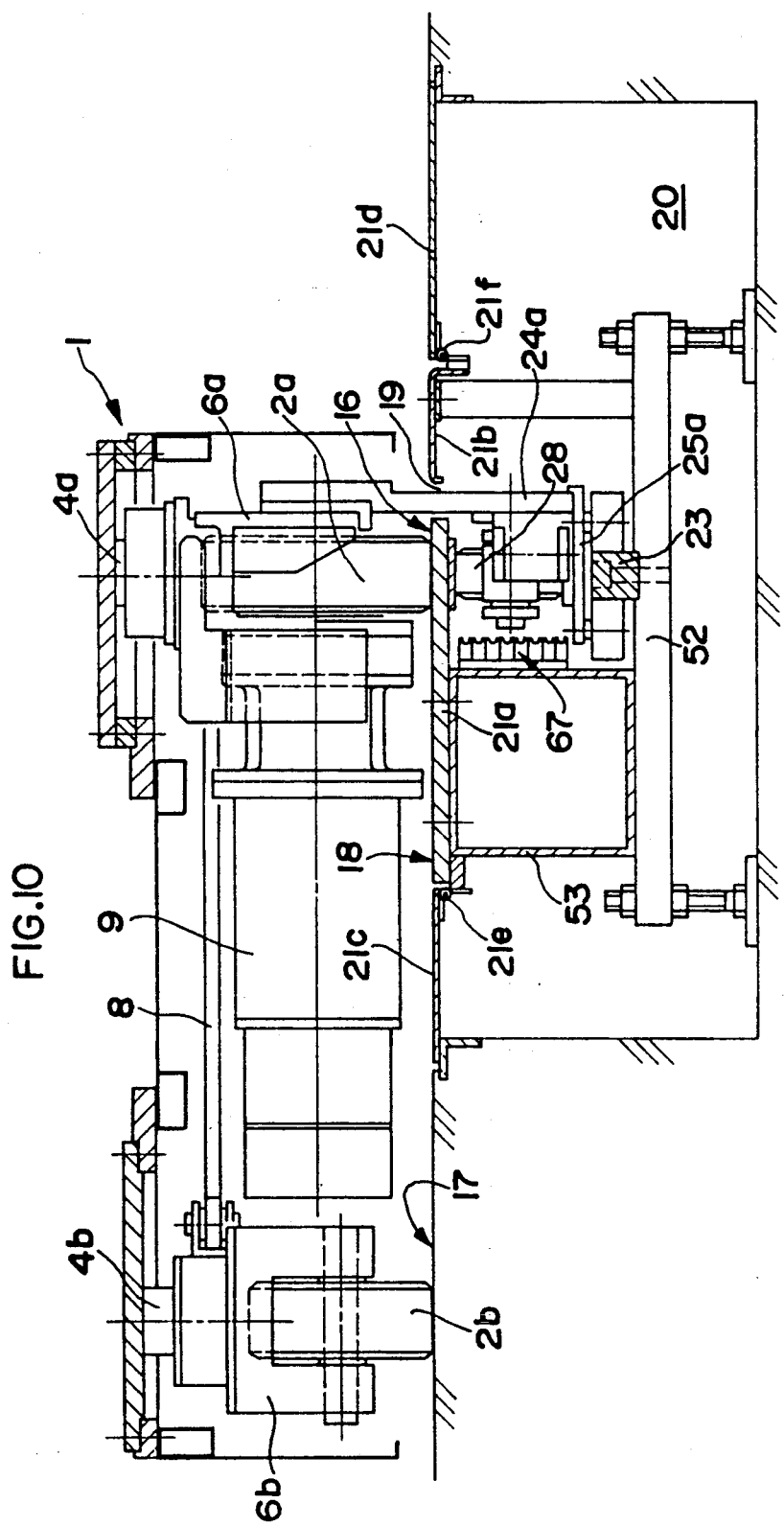

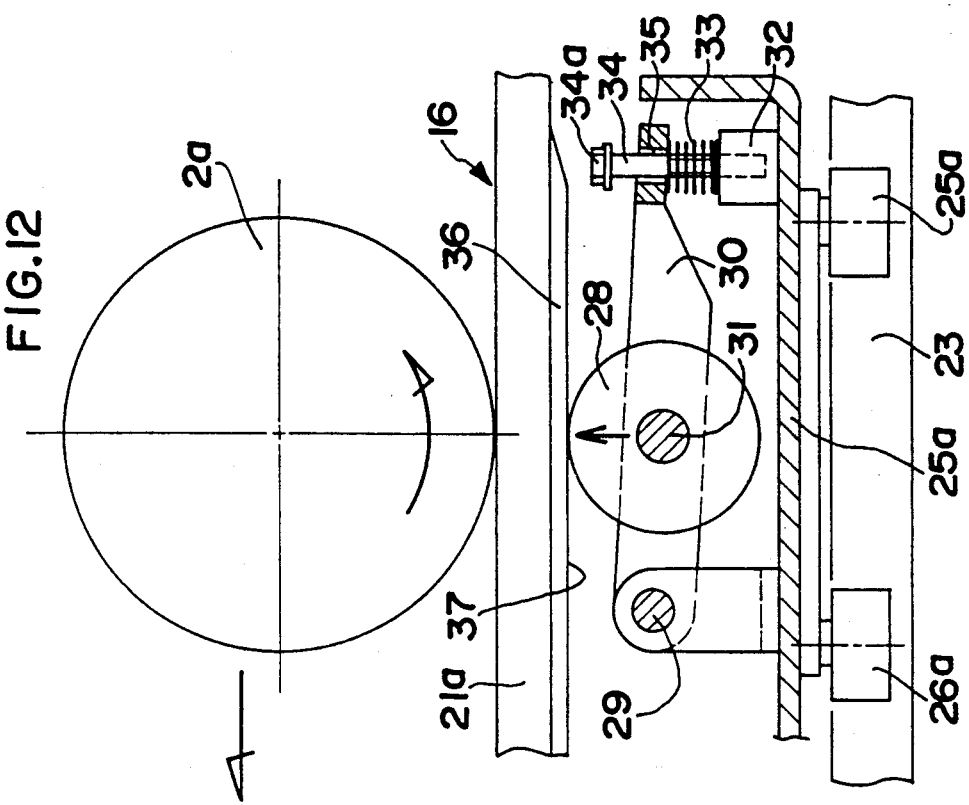
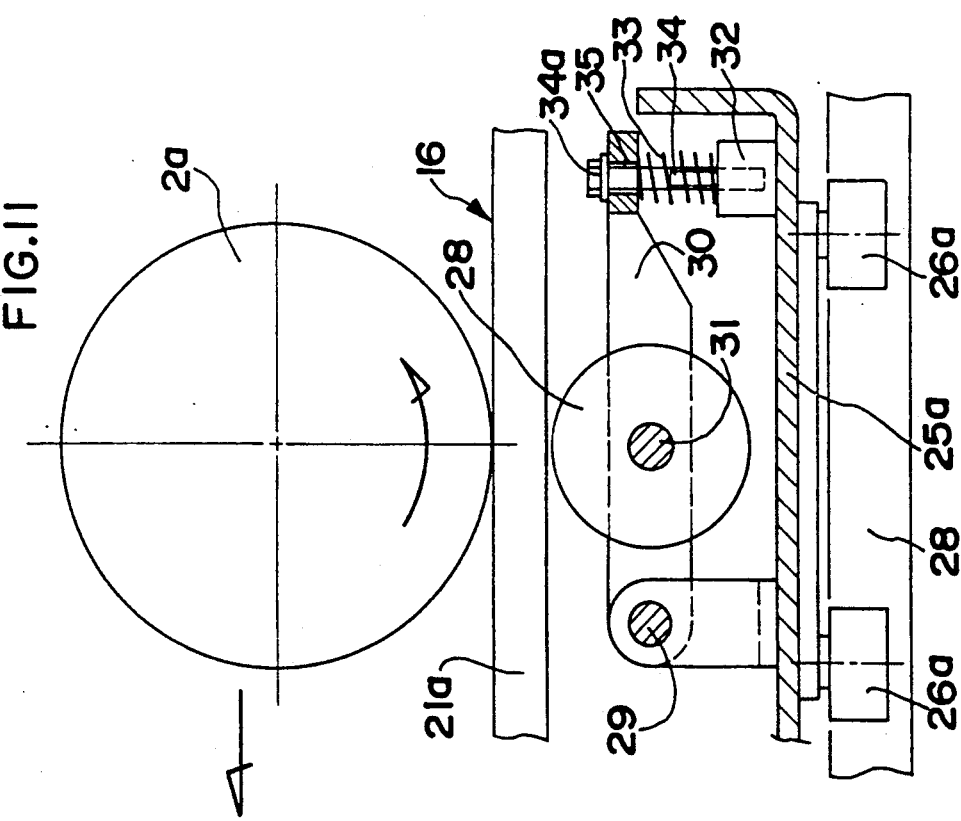

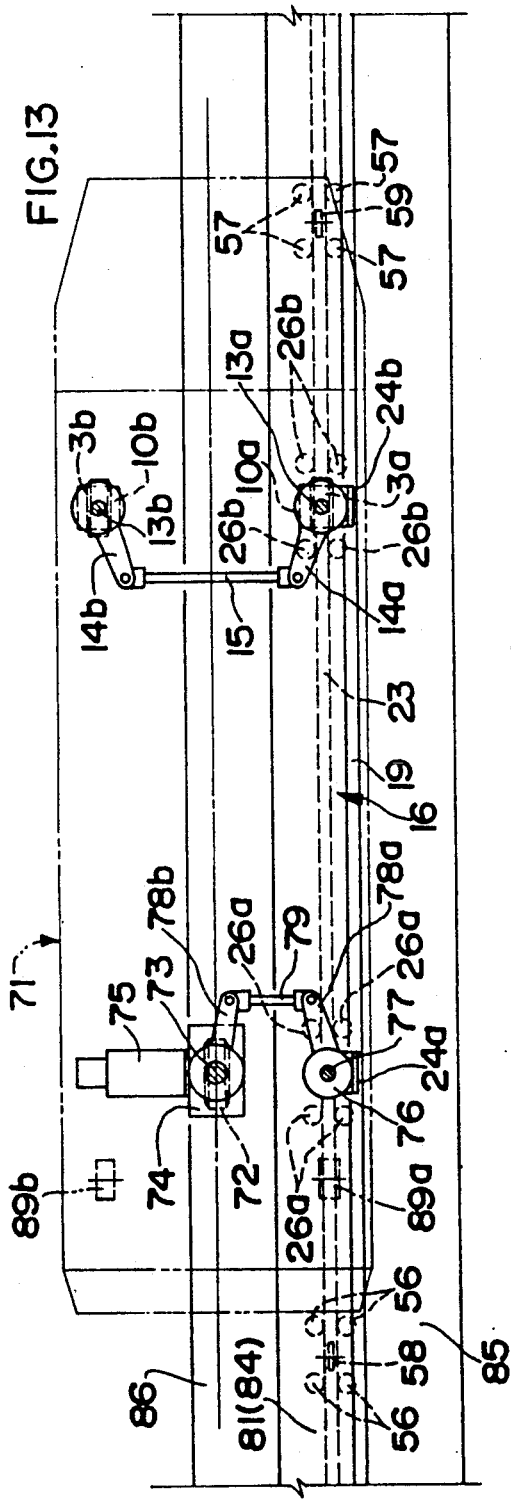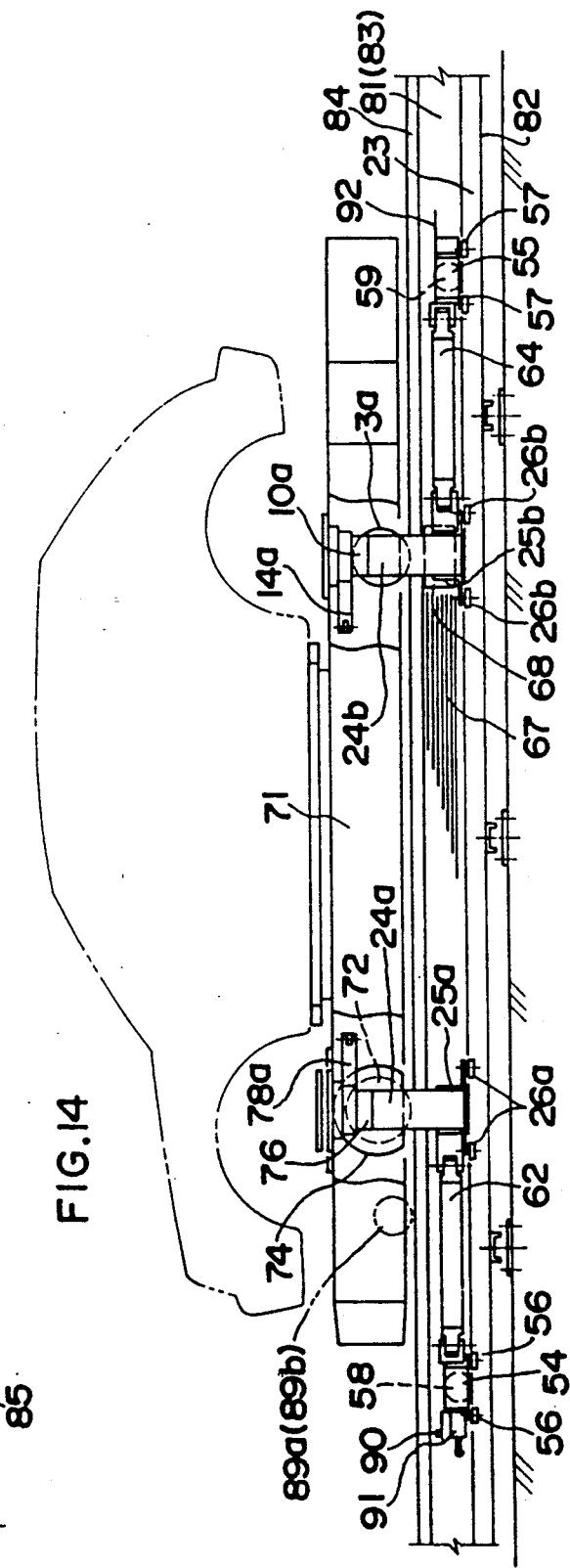

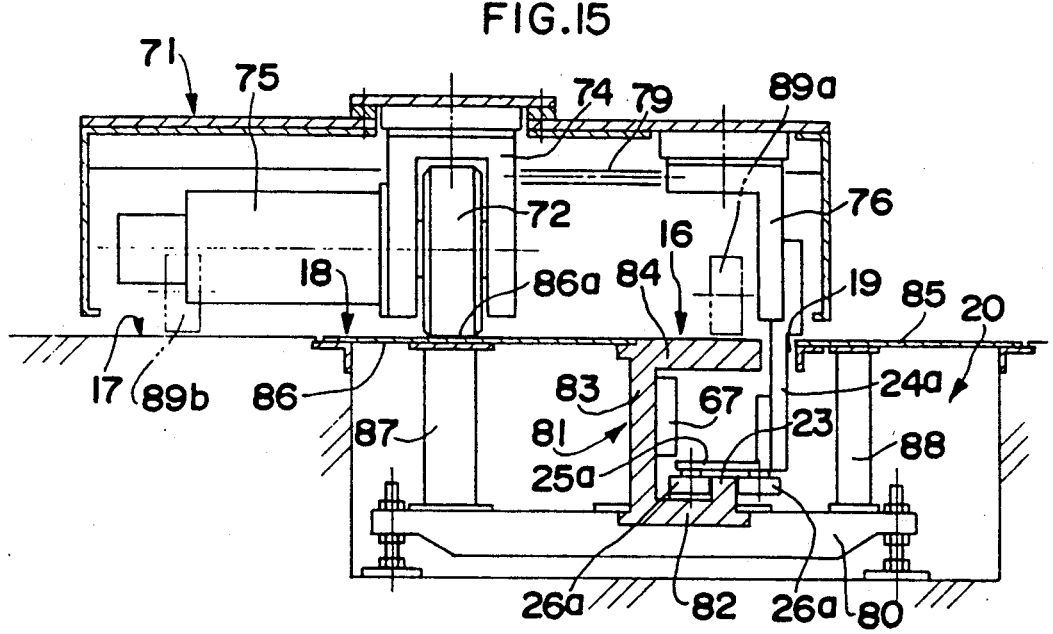
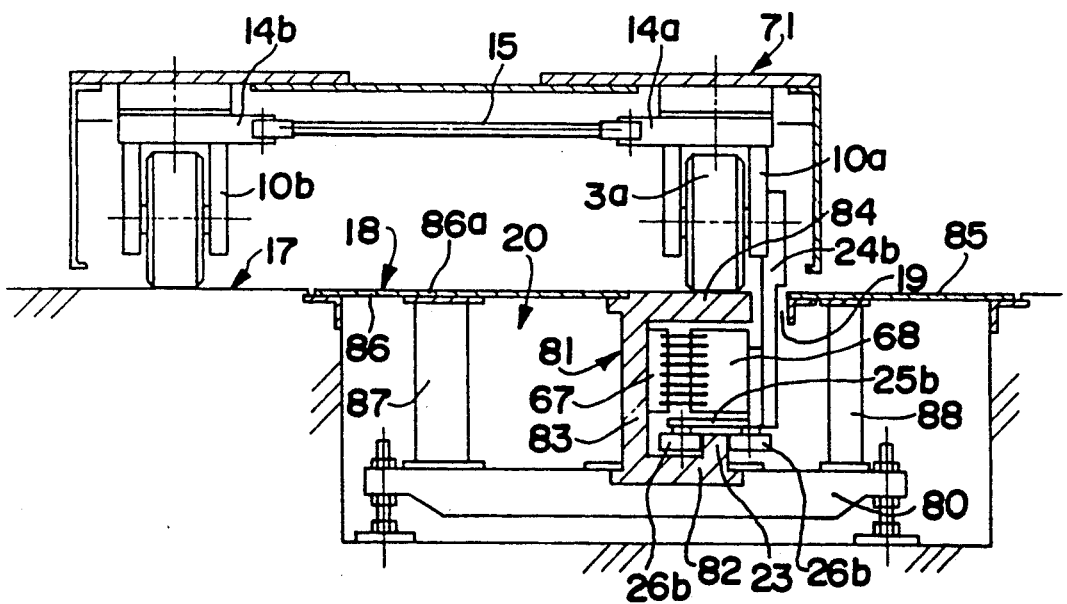

SELF-PROPELLED PLATFORM CAR TYPE CONVEYING SYSTEM

FIELD OF THE INVENTION

The present invention relates to a conveying system having a 4- or 3-wheeled self-propelled platform care (SPPC).

BACKGROUND OF THE INVENTION

In known conveying systems of the self-propelled platform car type, a 3-wheeled SPPC is provided at its front center with a motor-driven wheel, a steering guide rail laid below the rolling route of that driven wheel, in a pit below the floor. A steering trolley is engaged with the guide rail and a wheel shaft bearing capable of steering movement, which journals the shaft of the driven wheel is connected through a coupling member vertically ranging through a slit formed in the floor, at the center of the rolling route of the driven wheel.

In such a conventional conveying system, the steering guide rail and the steering trolley to be engaged by the guide rail are located below the driven wheel at the front center of the SPPC or below the central position of the SPPC. Therefore, even if floor plates placed along the slit are removed, such as in the case of repairing the trolley, work access is hampered by the SPPC that is located above the steering trolley.

Even if the driven wheel at the front center were to be steered by mechanical constraint along the steering guide rail, but since no means were available for subjecting the rear pair of wheels on the platform car to a constrained, guided steeringly following the steering guide rail, the resistance to running was relatively large, when this SPPC ran long a curved route. Therefore, this required a considerably high driving force.

DESCRIPTION OF THE INVENTION

The present invention has as its object solving the aforementioned drawbacks of the prior art. As slot is formed through the runway floor of the SPPC and a steering guide rail is provided in a pit just below the rolling route of the 3 or 4 wheels of the car. Front and rear steering motion transmitters include coupling means which range vertically through the slot. The front transmitter transfers the steering motion of the front steering trolley to the front wheel of the SPPC, and the rear transmitter transfers the steering motion of the rear steering trolley to the rear wheel of the SPPC.

When the SPPC has four wheels, each of the steering motion transmitters is suitably steering tie rod interconnecting two steerable wheel shaft bearings used for journaling the shafts of the right and left wheels. Coupling means of the steering motion transmitters penetrate vertically through the slot in the floor, and connect each steering trolley with a steerable wheel shaft bearing above the trolley.

When the SPPC is a 3-wheeled car, the motor-driven wheel is in the front, and the steering motion transmitter at the rear is suitably a steering tie rod interconnecting two steerable wheel shaft bearings. Coupling means of the steering motion transmitter vertically range through the slot and connect the steering trolley in the rear with the steerable wheel shaft bearings above the trolley. The steering motion transmitter at the front is suitably a rotating body supported form the platform car through a rotating vertical supporting shaft above the front steering trolley. A coupling member ranges vertically through the slot in the floor and connects the rotary body to the front steering trolley and a steering tie rod interconnects the rotary body with the steerable wheel shaft bearing of the shaft of the driven front wheel.

In the 3- or 4-wheeled conveying system of the present invention, the steering guide rail under the floor is suitably located below a side SPPC. Thus, during repair of the front and rear steering trolleys, the floor plates forming said slot are suitably removed, and the steering trolleys become accessible below a side of the SPPC, so that the work on the steering trolleys can be easily carried out from one side.

Since both the front and the rear wheels are subjected to constrained steering by the steering guide rail and the steering trolleys that are engaging it, the SPPC runs smoothly along any curved route with a relatively small driving force.

A 4-wheel SPPC is required for conveying large and heavy objects such as an automobile. In the case of 4-wheel SPPC, when two wheels are driven, this will not only increase the cost of the apparatus but makes control very difficult, resulting in loss of practical usefulness of the device. When only one of the 4 wheels is driven in the case of a 4-wheeled embodiment, only about one quarter of the total load acts on the motor-driven wheel and, therefore, the ground contacting pressure of the driven wheel is small, making a stable high speed run difficult.

Accordingly, it is another object of the present invention to eliminate the aforementioned drawback of the 4-wheeled SPPC. The shaft of the motor driven wheel is interconnected with the four wheels by a wheel shaft bearing connected directly to the steering trolley by the coupling member. The steering trolley pivotally supports a backup roller which is pressed by a spring against the surface of a downward facing backup rail in the pit.

This structure enables an increase of the ground contacting force of the motor driven wheel due to the upward pressure of the backup roller from one quarter the load on all of the four wheels. Rapid acceleration and a high speed drive run become possible, thereby enhancing the practical utility of the 4-wheeled SPPC with one driven wheel.

The backup roller is functional throughout the route of the SPPC. The spring-loaded backup function can be, however, suitably eliminated by omitting the downward facing backup rail having the running surface into which the backup roller is pressed into contact in sections where the driven wheel can be rotated without slippage where the friction between the wheel and its running surface is sufficient merely due to the load on the wheel, such as in sections where the SPPC can be continuously run at low speed. The useful life of the backup roller and the driven wheel are extended by reducing the forces on the backup roller and the driven wheel. This results in a reduction of operating costs, but in sections where the driven wheel might slip, such as when it is accelerated, for example in sections where the SPPC has to be run intermittently at high speed, the downward looking backup rail is provided, positively to increase the ground-contacting pressure of the driven wheel by the backup roller to enable the ability of the driven wheel to be positively accelerated without slipping.

The downward facing surface of the backup rail, together with the guide rail for the steering trolley can be attached from the underside of the floor plate and cantilevering toward the slot therein. Thus the steering trolleys are guided by the steering guide rail. Additional collision preventing trolleys can be used for preventing collision of the conveyed objects as independently running forward and rearward adjacent SPPCs on the same running route approach each other closer than a predetermined distance. For inspection and maintenance of parts below the running surface, only the floor plate at the side of the slot needs to be removed, without the need to remove the steering guide rail the placement of which requires highly fitting accuracy.

DESCRIPTION OF THE DRAWING

These and other objects, features and unique advantages and effects of the present invention will be even more readily understood from the following detailed description of various embodiments of this invention, with reference being had to the drawing, wherein FIG. 1 is a cross-sectional plan view, of a first embodiment of the invention;

FIG. 2 is a longitudinal cross-sectional side view of the embodiment of FIG. 1;

FIGS. 6 and 7 are enlarged longitudinal cross-sectional side views of an essential part of a second embodiment of the invention;

FIGS. 8A and 8B are plan views of a third embodiment of the invention;

FIG. 9 is a partly broken-away side elevation of the third embodiment;

FIG. 10 is a cross-sectional view of the front wheel structure thereof;

FIGS. 11 and 12 are enlarged sectional views of its essential part;

FIG. 13 is a plan view of a section of a fourth embodiment of the invention;

FIG. 14 is a partly broken side view thereof;

FIG. 15 is a cross-sectional view of the front wheel structure of the third embodiment; and FIG. 16 is a cross-sectional view of the rear wheel structure of the third embodiment.

DETAILED DESCRIPTION OF THE INVENTION

Figure 3:
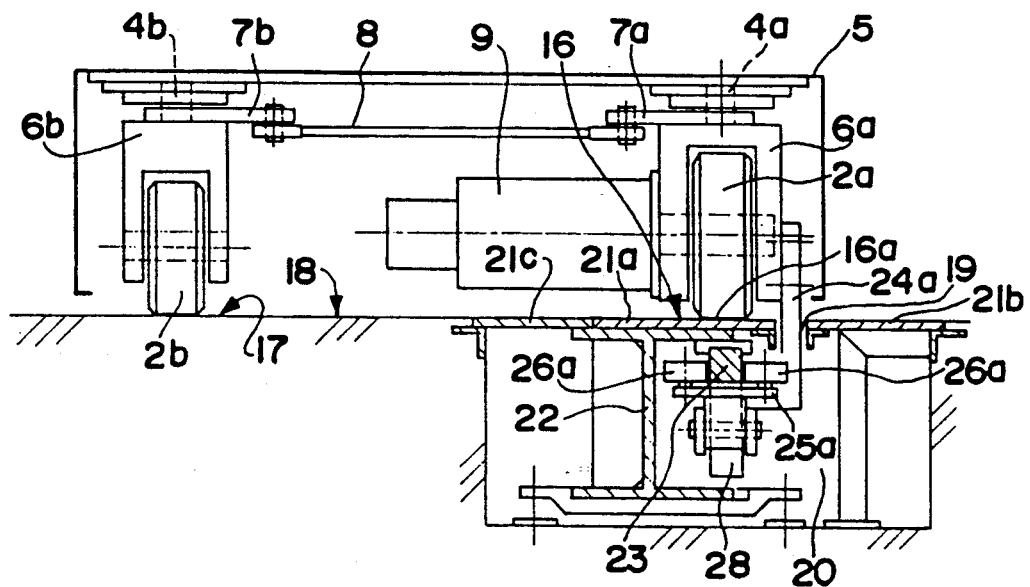
FIG. 3 is a cross-sectional view of the front-wheel structure of the platform car.
Figure 4:
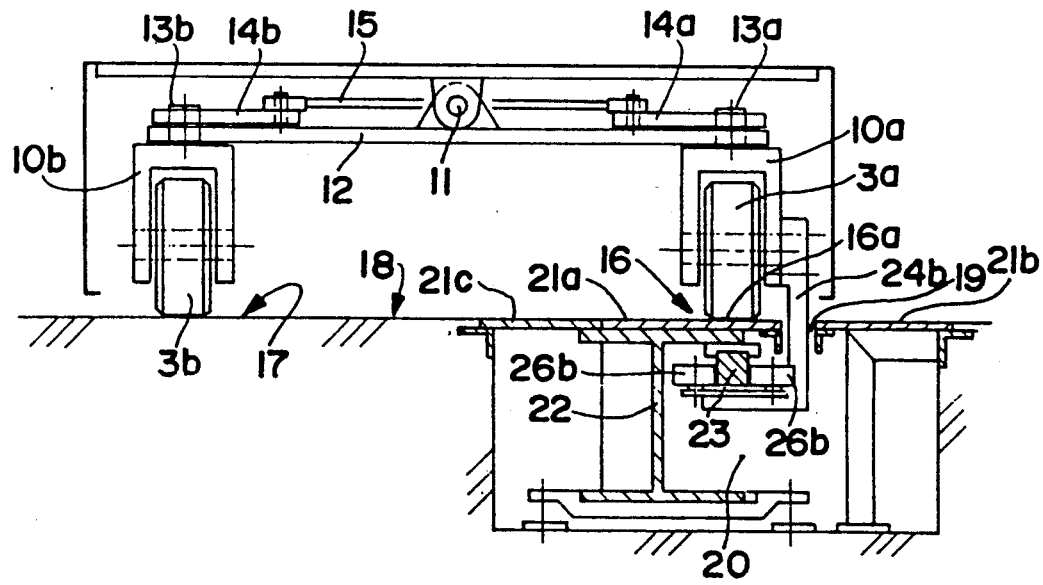
FIG. 4 is a cross-sectional view of the rear-wheel structure of the platform car.

In the first embodiment of the present invention shown in FIGS. 1-4, a conveying self-propelled platform car (SPPC) 1, has two pairs of right and left wheels 2a, 2b, 3a and 3b arranged respectively at the front and the rear of the car. The front pair of wheels 2a and 2b are mounted from shafts that are journaled in wheel shaft bearings 6a and 6b that are attached form the platform car (PC) frame 5 through respective vertical shafts 4a and 4b. Both wheel shaft bearings 6a and 6b are interconnected with each other for mutual steering movement through steering levers 7a and 7b extending obliquely fore- and inwardly from the wheel shaft bearings, and a tie rod 8. One of the wheels 2a is connected to a motor 9 mounted from the wheel shaft bearing 6a.

The shafts of the rear wheels 3a and 3b are journaled in rear wheel shaft bearings 10a and 10b. These rear bearings are respectively supported by vertical shafts 13a and 13b from the underside of the right and left ends of a laterally disposed movable frame 12. This frame is supported from the frame 5 of the platform car at its center by a longitudinal frame supporting shaft 11. The frame supporting shaft is adopted to make a vertical seesawing movement. The rear wheel shaft bearings 10a and 10b are interconnected with each other for mutual steering movement, through steering levers 14a and 14b extending obliquely rear and inwardly from the wheel shaft bearings 10 and 10b, and a tie rod 15.

Below, on the runway side of the conveying SPPC 1, there is formed a flat runway floor 18 structure for the car, having a first floor portion 17. The right wheel 2b and the left rear wheel 3b rolls on this first floor portion 17. A second floor portion 16 on which the left front and rear wheels 2a and 3a roll, is provided with a slot 19 extending continuously in the direction of the PC runway adjacent to the outside of the rolling route 16a the wheels 2a and 3a. A pit 20, shaped as a ditch, extends under and along the runway of the platform car. The ditch is covered by floor plates 21a-21c. The slot 19 is formed between the floor plates 21a and 21b. The floor plate 21a of floor portion 16, is laid over an H-beam 22 laid on its side and having an end plate as a cantilever arm toward the slot 19. At lest the floor plates 21b and 21c are removable or are adapted to be detachable openand closeable.

A steering guide rail 23, is disposed directly below the rolling route 16a of the left wheels 2a and 3a on the underside of the floor plate 21a or on the underside of the cantilevering part of the H-beam 22 which supports the floor plate 21a.

Front and rear steering trolleys 25a and 25b are connected respective front and rear coupling members 24a and 24b which is extending vertically from the pit 20, and penetrating through the slot 19, to the respective left front and rear wheel shaft bearings 6a and 10a. The shafts of pairs of front and rear guide rollers 26a in the front and 26b in the rear are mounted from the respective front and rear steering trolleys 25a and 25b. Each pair of rollers 26a and 26b, pinch the steering guide rail 23 from its sides at two places each in the front and at the back of the car under the respective wheels 2a and 3a. A backup roller 28 is pressed into contact with the downward facing backup rail surface 27 which is the underside of the steering guide rail 23. The backup roller 28 is mounted from the steering trolley 25a under the motor driven wheel 2a.

Figure 5:
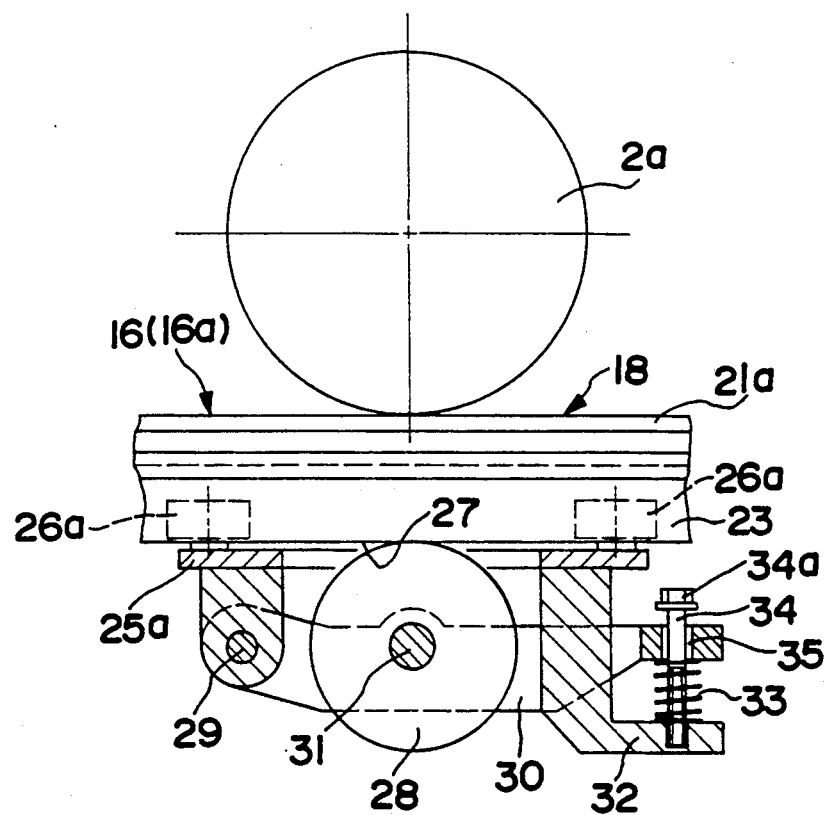
FIG. 5 is an enlarged longitudinal side view of an essential part of the first embodiment.

As shown in FIG. 5, the backup roller 28 is mounted from a shaft 31 at the center of a movable arm 30 held by the steering trolley 25a. The arm 30 is vertically swingably pivoted by a horizontal shaft 29. The movable arm 30 is pushed upwardly by a coil spring 33 inserted between the free end of the arm and a seat 32 for the spring which seat is extended downwardly from the steering trolley 25a. Under the bidirectional bias of the spring 33 (i) the backup roller 28 presses upward against the lower surface 27 of the guide rail 23 and (ii) as pulled down by the coupling member 24a, the motor-driven wheel 2a is pulled downwardly and is thus pressed against the floor portion 16 for increased friction. A bolt 34 ranges through a hole 35 in the free end of the movable arm 30, and has its end screwed into the seat 32. The coil spring 33 is inserted around the bolt 34, and the head of the bolt serves as an upper limit stopper 34a for the upward motion of the movable arm 30. Alternatively the spring seat 32 can be made to be adjustable in height relative to the steering trolley with use of a screw mechanism, thereby, enabling the adjustment of the upward pressure of the backup roller 28.

Suitably, the conveying SPPC 1 can be run on the runway floor 18 by driving the wheel 2a by a motor by supplying power to the motor through a current collector on the side of the PC from a feed rail disposed along a vertical side of the H-beam 22, or in a like manner. Even if the floor portions 16 and 17 are uneven, the ability of the longitudinal frame supporting shaft 11 of the movable frame 12 at the rear, to swing loosely up and down, enables positive contact between the rear wheels 3a and 3b with the respective floor portions 16 and 17 so that none of the wheels will float out of contact with the floor. Thus, the wheel 2a which is driven by the motor 9 will also continuously positively roll on the floor portion 16. Moreover, since this wheel 2a is also pressed against the floor portions 16 by the reaction to the bias of the spring 33, the ground contacting friction of the wheel 2a can be made sufficiently large, notwithstanding the fact that only one quarter of the load on all four wheels is on the driven wheel 2a.

Where the PC runway direction is along a horizontal curve, the wheel shaft bearing 6a and the wheel shaft bearing 10a are steered about vertical shafts 4a and 13a that are connected to the steering trolleys 25a and 25b along the steering guide rail 23, due to the guide following action of the steering guide rollers 26a and 26b. This turning is transmitted to the wheel shaft bearing 6b to the wheel 2b through its shaft, and the wheel shaft bearing 10b turns the wheel 3b through its shaft, respectively, through steering levers 7a, 7b, and 14a and 14b and tie rods 8 and 15. Thus, all wheels 2a-3b are steered along the horizontal curve of the steering guide rail 23, enabling the conveying SPPC 1 to run smoothly along the horizontal curve of the PC steering route or the horizontal curve of the steering guide rail 23.

In the second embodiment shown in detail in FIGS. 6-7, the backup roller 28 is held to the upper limit position, where it is not in contact with the lower side surface 23a of the steering guide rail 23, by the head 34a of the bolt 34.

In a section of the path of the car where the driven wheel 2a might slip due to lack of grounding frictional pressure of the wheel, such as in an intermittent high speed running section where while conveying SPPC 1 is run at a high speed, and the car has to be stopped at various work stations as shown in FIG. 7, a rail strip 36 is interposed between he underside of the steering guide rail 23, and the backup roller 28, and the underside 37 of the rail strip 36 presses against the backup roller and against the bias of the spring 33.

Thus at those places where such a rail strip 36 is provided the driven wheel 2a is pressed more intensively into a frictional arrangement with the floor portion 16, foreclosing the possibility of slippage of the driven wheel 2a such as when accelerating thus ensuring the high speed intermittent running of the conveying SPPC 1.

In the third embodiment of the present invention, as shown in FIGS. 8-10, 51 denote a conveying SPPC. The parts of the conveying SPPC 51 that are above the PC runway floor 18, are the same as that of the conveying SPPC 1 of the first two embodiments.

Supporting members 52 are installed in the underfloor pit 20, at appropriate intervals in the running direction of the PC. An intermediate supporting member 53 formed from a square steel pipe contiguously extending in the running direction of the car is disposed over the supporting members 52. The floor plate 21a is placed over the intermediate supporting member 53. The floor plate 21a cantilevers toward the slot 19. The steering guide rail 23 is laid on the supporting member 52 underneath the rolling route 16a on said floor plate 21a.

In this third embodiment of the present invention, a narrow fixed floor plate 21b covers the pit 20, and is supported by the supporting member 52 by forming the slot 19 in conjunction with one side of the floor plate 21a, an openable and closable floor plate 21c is joined to the other side of the floor plate 21a by a hinge 21e, and another openable and closable floor plate 21d is joined to the fixed floor plate 21b by a hinge 21f, to facilitate inspection and repair of the parts within the pit 20.

The shafts of the two front pairs of steering guide rollers 26a and two rear pairs 26b for the front and rear steering trolleys 25a and 25b, are mounted from the undersides of the steering trolleys 25a and 25b, to pinch the steering guide rail 23 on the underside of the steering trolleys 25a and 25b. As shown in FIG. 12, the rail strip 36 with its underside 37 is laid on the underside of the floor plate 21a. As also shown in FIGS. 11 and 12, the backup roller 28 is in this third embodiment arranged on the upper side of the steering trolley 25a.

In FIGS. 8 and 9, collison proof trolleys 54 and 55 are provided for preventing collision between objects being conveyed. When the length of the object carried on the SPPC 51 is longer than the length of the self-propelled platform car, then each of the trolleys is provided with additional front steering guide rollers 56 and rear steering guide rollers 57 each pair of which pinches the frontal front steering guide rail 23 from both sides at the front of each pair and rear front pair 56 and frontal rear pair and rearward rear pair 57. A front supporting wheel 58 and a rear supporting wheel 59 each roll on the steering guide rail. A front rubber bumper 60 is provided in the front of the front head trolley 54 that is in front of the front steering trolley 25a and connected thereto by a connection rod 62. Vertical pins 63a and 63b are inserted in at both ends of the rod 62 for connection. A tail trolley 55 is connected to the rear steering trolley 25b through a connection rod 64 and vertical pins 65a and 65b inserted in both ends of the rod. A rear rubber bumper 61 protects the rear of the tail trolley. As shown in FIG. 9, a just-before collision detector 66 which enables detection of the tail trolley 55 of a preceding platform car can be attached to the head trolley 54.

The conveying SPPC 51 may be self-propelled by driving the driven wheel 2a by operating said motor 9 by supplying power to the motor 9 from a feed rail 67 mounted on the side of the intermediate supporting member 53 in the pit, through a current collector 68 mounted from the steering trolley 25b, or the coupling member 24b on the side of the platform car.

In operation, automatic steering along the steering guide rail 23 is affected by the front and rear trolleys 25a and 25b and the feature that in those route sections where a rail strip 36 with its underside 37 is provided, the friction of the driven wheel 2a is increased by the backup roller 28 in the same manner as in the embodiment described previously.

The head trolley 54 runs together with the SPPC 51 on the steering guide rail 23, pushed by the car, and the tail trolley is pulled by the car. If a preceding car is stopped along the route, as a following car approaches it to within a predetermined distance, the just-beforecollision detector 66 detects the tail trolley 55 of the preceding SPPC 51. The detection signal can be used automatically to stop the following car.

In this embodiment, the means for preventing the driven wheel 2a from rising up from the runway floor surface is not shown, however a similar movable frame can be employed in the front as was described in detail in connection with the movable frame 12 in the rear.

The fourth embodiment of the present invention shown in FIGS. 13-16, uses a three-wheeled SPPC 71.

A driven wheel 72 is centrally arranged at the front of SPPC 71. The shaft of the wheel 72 is journaled in a bearing 74 that is steerable about a vertical shaft 73. A driving motor 75 is mounted on the bearing 74 and is connected with the driven wheel 72. A rotary steering body 76 is connected from the front steering trolley 25a through a coupling member 24a. The rotary body 76 is linked to, and supported by, the PC frame of the platform car from a vertical shaft 77. The body can turn about the shaft 77 by steering, and it is interconnected with the wheel shaft bearing 74 through steering levers 78a and 78b extending respectively from the rotary body 76 and the wheel shaft bearing 74. A tie rod 79 interconnects the steering levers 78a and 78b. The right and left rear wheels 3a and 3b and the steering trolley 25b are interconnected as in previously described embodiments of the present invention.

A guide rail 23 is disposed in a pit 20 below the floor, for guiding front and rear steering trolleys 25a and 25b is formed as the bottom part of a C-shaped beam rail 81 protruding upwardly from the lower horizontal portion 82 thereof. The C-shaped beam 81 is supported on a supporting member 80 in the pit 20. The top of the C-shaped rail 81 forms a floor plate portion 84 contiguously extending from the lower, horizontal portion 82, through a vertical wall portion 83 integral therewith, to the top surface portion 84 forming a part of the runway floor surface for the platform car.

As shown in FIG. 5, the pit 20 is covered by the floor plate portion 84 of the rail member 81 and a slot 19 is formed through which a coupling member 24a connects the steering trolley 25a. The part 86a of floor plate 86, which serves as the rolling route of the driven wheel 72, is supported by the supporting member 80 through a column 87. The free end of the floor plate 85 is supported by said supporting member 80 through a column 88.

Since in this third embodiment of the present invention the driven wheel cannot lift up from the floor, as could happen in the case of some 4-wheeled SPPC structures, the backup roller 28 and the backup roller surfaces 27 and 37 of prior embodiments, are not required in this embodiment of the present invention. As shown respectively in FIGS. 13-15 by broken lines, near the front end of the SPPC 71, optional right and left auxiliary wheels 89a and 89b for drop-off prevention can be added somewhat above the runway floor surface 18.

When collision-proofing is desired, a head trolley 54 can be added, with a bumper 91 and a detector 90 for stopping the drive, and the tail trolley 55 can be provided with a signaling plate 92 which is to be detected by the detector 90 of a following car.

Power to the SPPC 71 can be supplied from a feed rail 67 laid along a vertical wall 83 of the rail member 81, to supply the motor 75 through a current collector 68 mounted on the steering trolley 25b. The steering motion of the steering trolley 25a which is engaged with the steering guide rail 23 is transmitted from the coupling member 24a to the wheel shaft bearing 74 through the rotary body 76, steering levers 78a and 78b and a tie rod 79, whereby the driven wheel 72 is steered tangentially to the steering guide rail 23 located just below the steering rotary body 76. The right and left rear wheels 3a and 3b are steered along the steering guide rail 23 similarly as in the earlier described previous embodiments.

In any embodiment of the present invention, even if the interconnected steering components means for such as the steering levers 14a, and 14b and the tie rod 15, are omitted the SPPC can be smoothly steered along the steering guide rail 23 by using a caster wheel which is steerable about a vertical shaft, such as the wheel 3b. However, when the interconnected steering components between the wheels 3a and 3b are also employed, then when the rotation of the driven wheel is reversed, the care will start its reverse run smoothly.

We claim:

1. A self propelled platform car (SPCC) type conveying system, which comprises a SPCC having at least three steerable wheels disposed respectively at the front and at the back of the SPCC, at least one of said wheels being motor driven, a runway for providing a rolling track for said wheels, a guide rail disposed below said rolling track, front and back steering trolleys engaged with said guide rail for being steered thereby, and front and rear steering motion transmitting means for transmitting steering motion from a steering trolley to a corresponding wheel, said steering motion transmitting means having coupling members extending substantially vertically along a side of said rolling track.

2. The conveying system of claim 1, further comprising a runway floor associated with said runway, a continuous slit within said floor for passing said steering motion transmitting means therethrough, and a pit below the conveying system, said guide rail being located within said pit.

3. The conveying system of claim 1, wherein the SPCC has four steerable wheels with shafts each arranged within a bearing, said wheels being arranged in two pairs, each of said steering motion transmitting means includes a steering tie-rod connecting the bearings of respective shafts of a pair of adjacent wheels.

4. The conveying system of claim 3, the SPCC further comprising a frame, and a longitudinally extending supporting shaft, said frame being laterally movably pivoted at its center by said supporting shaft.

5. The conveying system of claim 2, further comprising guiding rollers for guiding said steering trolleys from the underside of said guide rail under the runway floor.

6. The conveying system of claim 5, further comprising a downward looking back-up rail cantilevering towards said slit in the floor.

7. The conveying system of claim 6, wherein said downward looking back-up rail is intermittently arranged along the path of the SPCC.

8. The conveying system of claim 1, having three wheels with one motor driven wheel in the front of the SPCC and two wheels in the back, said steering transmitting means in the front including a wheel shaft and a bearing for said shaft, a vertical supporting shaft, a rotary body supported by the platform car through said vertical supporting shaft and being rotatable therearound, said coupling member connecting said rotary body with the steering trolley in the front, and a steering tie-rod connecting said rotary body with said wheel shaft bearing for steering the same.

* * * * *